May 14, 1957 F. SLAMAR ET AL 2,792,504
SIDE REGISTER REGULATOR
Filed July 12, 1951 3 Sheets-Sheet 2

WITNESSES:
E. A. McCloskey
Nw. C. Groome

INVENTORS
Frank Slamar and
Robert E. Hull.
BY
Paul E. Friedemann
ATTORNEY

May 14, 1957  F. SLAMAR ET AL  2,792,504
SIDE REGISTER REGULATOR

Filed July 12, 1951  3 Sheets-Sheet 3

WITNESSES:

INVENTORS
Frank Slamar and
Robert E. Hull.
BY
ATTORNEY

United States Patent Office 2,792,504
Patented May 14, 1957

2,792,504
SIDE REGISTER REGULATOR

Frank Slamar, East Aurora, and Robert E. Hull, Buffalo, N. Y., assignors to Westinghouse Electric Corporation, East Pittsburgh, Pa., a corporation of Pennsylvania Application July 12, 1951, Serial No. 236,438

4 Claims. (Cl. 250—219)

Our invention relates to electrical systems of control for maintaining a selected desired registration between two relatively movable objects, and particularly for maintaining a moving member in a selected path of travel.

One object of our invention is to provide for controlling a motor, coupled to shift a web transverse of its path of travel in such a manner, when the web moves from its normal or desired path of travel, that the web is restored to its normal path of travel in accordance with the magnitude and the direction of deviation of the web from its normal path of travel.

Another object of our invention is to provide a system of control equally responsive to the transverse shifting of the edge of a sheet of material and the transverse shifting of a line disposed longitudinally of the sheet of material.

It is also an object of our invention to provide a control that is responsive to a selected type of error signal obtained from the transverse shifting of a sheet of material from a selected path of travel to thus be unaffected by the surface characteristics of the material.

Figure 1:
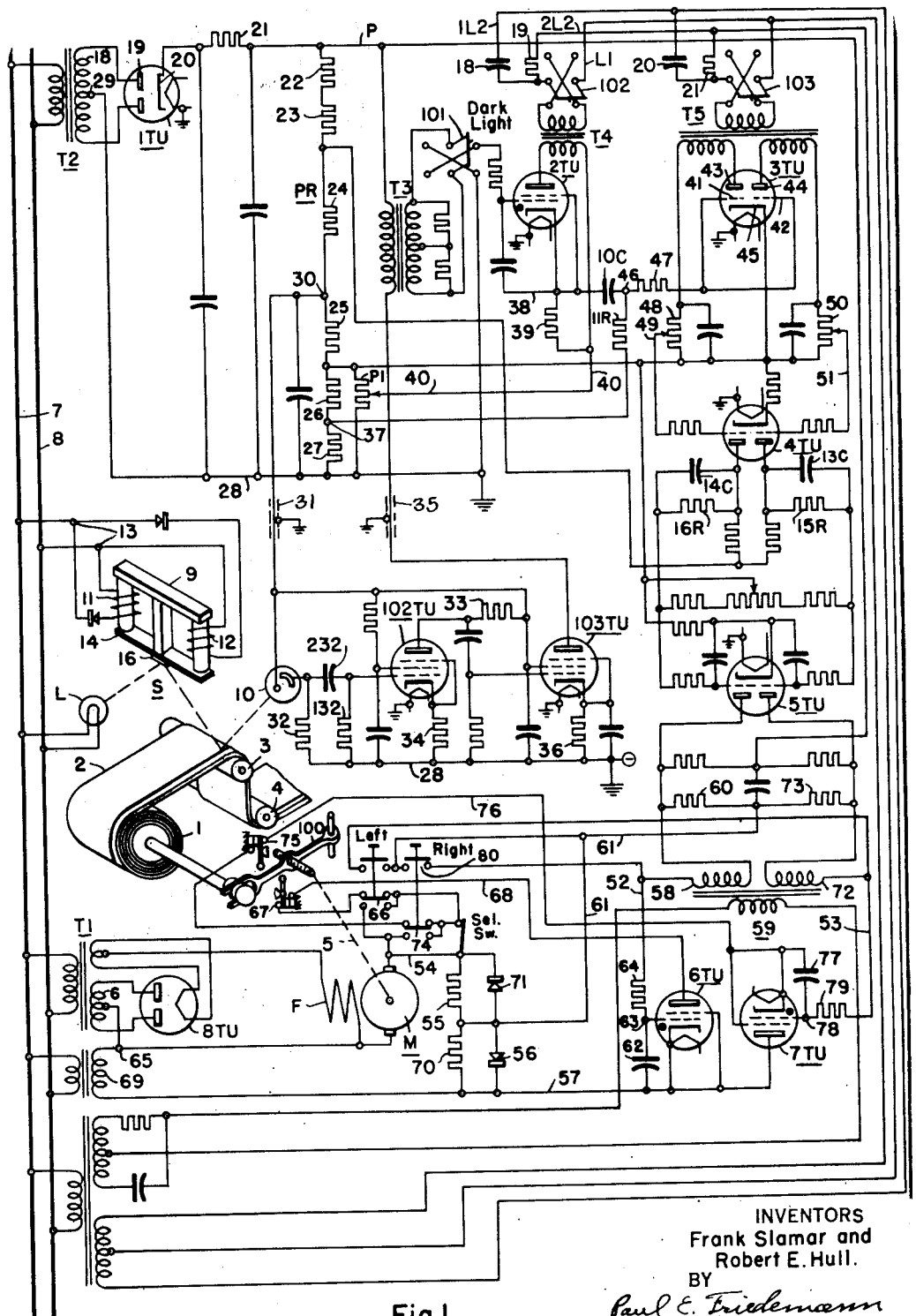

Other objects and advantages will become more apparent from a study of the following specification and a study of the accompanying drawings, in which:

Figure 1 is a diagrammatic showing of our control circuits, and the components of our control apparatus, as applied to a machine for operating on a web, or sheet, of material; and Figs. 2 to 13, inclusive, show some curves for illustrating the principle of operation of our invention.

The machines to which our system of control may be applicable are winders, slitting machines, and any other machines through which a web, or strand, of material is moved and the direction of its longitudinal movement with reference to the machine is to remain fixed.

In the drawings, Figure 1 shows diagrammatically an example of our regulating system as applied to a machine having a rotatably mounted supply reel 1, from which a web of material 2 is caused to move into a machine, where an operation is to be performed on the material. The web 2 travels from the supply reel 1 over the guide rollers 3 and 4 to the processing equipment (not shown), and must maintain a fixed path of travel relative to that equipment.

Our control system is well adapted to the use of the edge of the material as a reference guide, or index mark, and our disclosure will in the main proceed on the supposition that the movement of the web edge is the intelligence, or source of the signal, for controlling the web movement. However, when the web edge is not used, a guide line printed on the web is used as the signal source, and such printed line thus represents the index mark.

In order to regulate the path of travel of the web 2, the rotatably mounted reel 1 is so mounted that it may also be axially displaced by means of adjusting equipment schematically represented by the screw-threaded shaft 5 operating on the pivoted bifurcated arm 100 having threaded engagement with the threaded shaft 5. The showing is merely schematic to illustrate the principle of operation. In actual practice the mechanism is somewhat more elaborate. Since the means for axially shifting the supply reel do not per se constitute our invention, it suffices to know that rotation of shaft 5 in one direction moves the reel 1 backward in line with its axis and rotation of the shaft 5 in the opposite direction moves the reel forward in line with its axis.

To effect the appropriate movement of shaft 5, the shaft 5 is coupled to the armature of the motor M. This motor M is provided with a field winding F connected to be energized at a constant selected excitation by the full wave rectifier tube 8TU. The anode terminals of this tube are connected to the outside, or end, terminals of the secondary winding 6 of the transformer T1 having its primary terminals connected to the alternating current buses 7 and 8 providing an alternating current supply of fixed voltage and frequency. A mere inspection of the circuits for the field winding F will suffice, to those skilled in the art, for an understanding of the manner in which the field winding F is excited.

The running direction and speed of the motor is controlled by the effective direction and effective magnitude of the current traversing the motor armature. Both the effective direction and effective magnitude are under the control of the photoelectric scanning equipment to be described presently.

The scanning apparatus S is fixed with reference to the guide rolls 3 and 4, and includes a source of light L, an oscillator 9, and a photocell 10. The illustrated oscillator 9 has two coils 11 and 12, disposed on the respective pole pieces shown, and energized from the alternating current terminals 13 which are impressed with alternating voltage from the buses 7 and 8.

A rectifier is connected in series with each coil 11 and 12 and the connection is such that for one half cycle, coil 11 is energized and for the second half cycle, coil 12 is energized. A rocking armature 14 is pivoted on the oscillator structure so that it is driven to oscillate in synchronism with the alternating-current voltage. The middle portion of the armature 14 carries a mirror 16 so shaped that it focusses and reflects a beam of light coming from the source of light L, in a sharply defined rectangular spot onto the web 2.

Since the mirror 16 oscillates, the total illuminated spot extends transversely across the web edge and, when the web is in the desired position, has two equal portions on each side of the web edge. In view of the rectangular shape of the image a maximum effect is produced on the photocell 10.

We provide a suitable source of direct current potential by effecting appropriate energization through rectifier tube 1TU of the positive lead P and negative lead 28. The anode terminals of this rectifier tube are connected to the outside terminals of the secondary winding 18 of the transformer T2 having its primary winding connected to the leads 7 and 8. The mid-tap 29 of the secondary winding 18 is connected to the negative grounded lead 28. The direct-current supply circuit may be traced from the upper terminal of the secondary 18 through anode 19, cathode 20, impedance device 21, which device may be a resistor and reactor combination, or a resistor, or a reactor, potentiometer PR including resistors 22, 23, 24, 25, 26 and 27 to the negative lead 28. For the second half cycle the current, of course, flows from the lower anode of the tube 1TU. Suitable filtering capacitors are shown connected in parallel to the potentiometer PR.

The photocell circuit may be traced from the junction 30 through the shielded conductor 31, through the photocell 10, and the resistor 32 to the negative lead 28. (All grounded junctions are considered as the lead 28.) The circuitry in parallel with the photocell includes, among other elements, the resistor 33, the amplifying tube 102TU, and resistor 34.

The resistor 132 and the capacitor 232, connected in series with the resistor 132, are connected in parallel with the resistor 32. The photocell 10 is thus connected in a circuit in the nature of a bridge circuit in which the photocell 10 comprises one leg of the bridge, resistors 32 and 132 and the capacitor 232 comprise a second leg of the bridge, resistor 33 and the anode of the tube 102TU comprise a third leg of the bridge, and the cathode of tube 102TU and the resistor 34 comprise the fourth leg of the bridge. The output circuit of this bridge is the circuit for the bottom grid, or control grid of the tube 102TU. This bridge circuit may be considered as in a balanced condition when the control grid voltage in relation to the voltages of the other terminals of the tube 102TU in such that the tube 102TU is not fired. When an impulse voltage appears from the photocell 10, the tube 102TU is caused to fire, or break down. Under these conditions, the bridge circuit may be considered as unbalanced.

The capacity of capacitor 232 and the resistance value of resistor 132 and the characteristics of associated elements are chosen to have a short time constant such that only sudden changes in reflected light, as changes which occur when the light image crosses an edge, or a line, will cause a voltage pulse at the grid of the tube 102TU.

Further, the circuit constants and characteristics of the components associated directly with the photocell, and the remainder of the control, presently to be described, are so chosen that motor M is not caused to operate, not only when the web is in registry, but also when there is no web on the roll 3. This is rather important because the devices of the prior art can not differentiate between an empty machine and a full machine. In consequence, when the machine was empty a signal was produced to drive the reel to one extreme position and limit switches, or other safety devices had to be provided to prevent damage to the motor or other apparatus.

When a web is passing over the rolls 3 and 4 and all the parts are in proper operation and the edge of the web is where it is supposed to be, then the sweeping spot of light, or image, will cause the current flow in the photocell to abruptly change from a given value to some other value as the image sweeps, say from the roll 3 across the edge or across the marks, if marks are used, over the web. The current stays at the changed value for the period the image is on the web and then abruptly changes back to the original value. This current change produced each time the image crosses the material edge produces a pulse voltage across resistor 132 and in consequence the grid bias on tube 102TU is changed and the current flow through tube 102TU follows, in amplified form, the current changes in the photocell.

The output circuit of tube 102TU is connected to the grid circuit of the amplifier tube 103TU and this tube thus manifests current changes in its anode circuit, in amplified form, corresponding to the current changes in the photocell 10.

The anode circuit of tube 103TU may be traced from the positive lead P through the primary winding of the peaking transformer T3, the shielded lead 35, the tube 103TU and resistor 36 to the negative lead 28.

When a printed line is used, namely a dark line on a light background, and the web is in the desired position, the secondary of the peaking transformer T3 produces two equally spaced alternating current pulses per cycle. This is so because the image crosses the line every half cycle. The pulses produced under these conditions are shown in Fig. 2.

Figure 2:
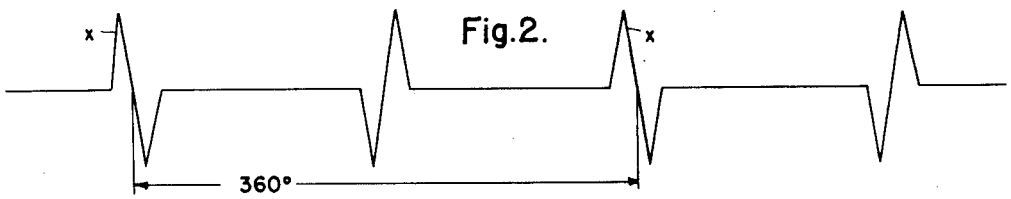
Figure 3:
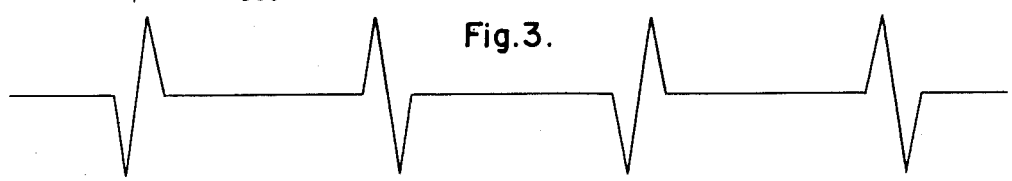

If the contrast is reversed from a dark line on a light background to a light line to a dark background, then the pulse form will be inverted from the showing in Fig. 2 so that the positive portion of the pulse in each case will now occur after the negative portion. This condition is indicated in Fig. 3. Not to alter the firing conditions on tube 2TU, we provide the manually operable reversing switch 101. If the tube 2TU is set for a given position of switch 101 to fire on the initial portion of a positive pulse, namely at points $x$, when the line is dark and the background light, then, if the contrast is reversed the position of switch 101 is changed to make the pulse at the grid of tube 2TU appear as shown in Fig. 2 and the tube 2TU will still fire on the initial portion of the pulse, namely at points corresponding to points $x$.

Figure 4:
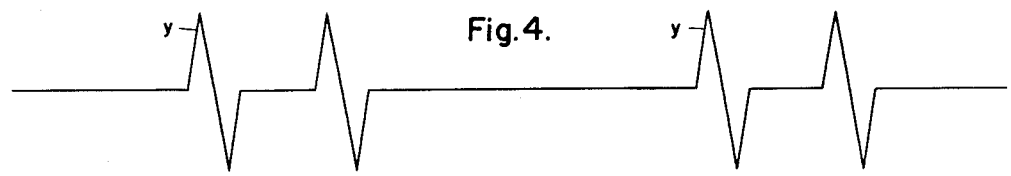
Figure 5:
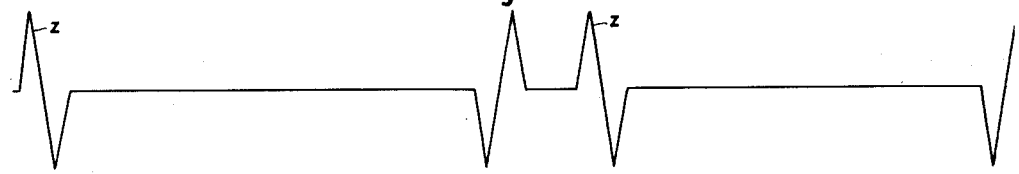

When the line on the web is out-of-line in the rearward direction, the pulses will be as shown in Fig. 4, and the tube 2TU will now fire at points $y$. It will be noted that points $y$ are displaced to occur later than the points $x$, which are the points of reference. When the line on the web is out-of-line in the forward direction, then the pulses will be as shown in Fig. 5. Now the tube 2TU will fire at points $z$. It will be noted that points $z$ are displaced to occur earlier than the points $x$, the points of reference. For the conditions just posed it is, of course, assumed that switch 101 is in the correct position. If it is found not to be in the correct position, it may be correctly positioned to make the events at $y$ and $z$ occur later and earlier, respectively, with reference to the time represented by points $x$.

Figure 6:
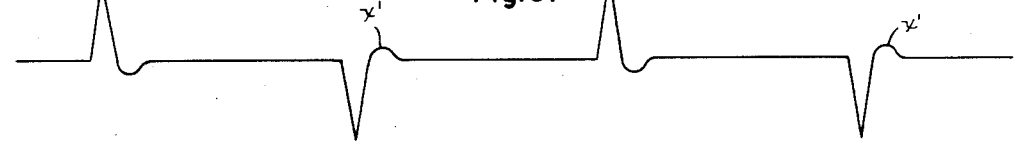

When the web edge is used and the web is traveling in the correct direction, then the peaking transformer secondary produces pulses as shown in Fig. 6. In this case, the tube 2TU is caused to fire at points $x$, assuming, of course, that switch 101 is in the correct position.

The sensitivity of tube 2TU may be adjusted so that the overshoot at points $x'$ is ordinarily not of sufficient magnitude to fire tube 2TU, but the correct operation is to place the switch 101 in the correct position so that the initial positive portion of the pulse triggers the tube 2TU. The overshoot of the pulse does not occur at true registry of the web but some time later. It is thus important to properly use switch 101.

Figure 7:
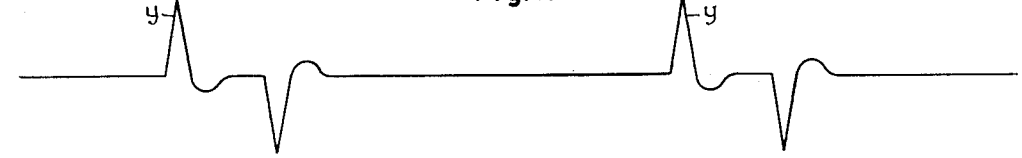
Figure 8:
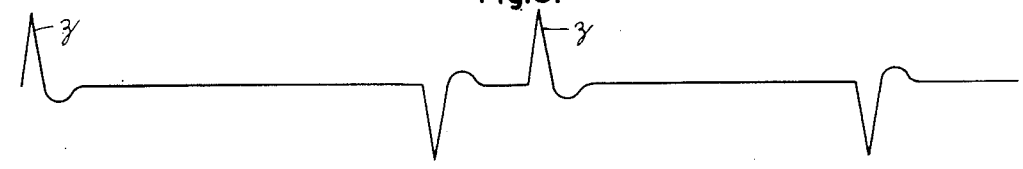

When the edge of the web is out-of-line in the rearward direction, the pulses will be as shown in Fig. 7, and the tube 2TU will now fire at points $y$. It will be noted that points $y$ are displaced to occur later than points $x$, the points of reference. When the edge of the web is out-of-line in the forward direction, then the pulses will be as shown in Fig. 8. Now the tube 2TU will fire at points $z$. It will be noted that points $z$ are displaced to occur earlier than the reference points $x$.

From the foregoing, it will be apparent that the effective output of the tube 2TU is the same regardless of whether a line or an edge is scanned. We believe this is an important contribution to the art to which our invention belongs.

In our showing, the tube 2TU is a conventional thyratron tube having only two principal electrodes. By the use of the tube 2TU it is apparent that we utilize only one pulse per cycle, that is, one pulse per 360 electrical degrees. This one pulse fires the tube 2TU once every cycle, and the firing time with reference to the alternating current supply, by the circuits shown, may be selected to occur at any convenient point during the cycle. To accomplish this, we provide the phase shift circuit and the manually operable polarity reversing switches 101 and 102 shown in connection with the grid circuit and supply circuit, respectively, of tube 2TU.

The anode circuit for the tube 2TU is supplied from the secondary of the transformer T4 with the output current flowing from the left-hand terminal of the transformer secondary through tube 2TU, the lead 38, through resistor 39 to the junction 40 and then back to the right-hand terminal of the secondary of transformer T4. The direct-current voltage bias for tube 2TU is introduced in series with the pulse voltage through the sensitivity potentiometer P1.

The primary winding of the transformer T4 is supplied with alternating current from the leads 7 and 8 through suitable circuits connection means including lead L1 and leads 1L2 and 2L2 and the phase shift elements comprising the capacitor 18 and the resistor 19, and transformer connections, to leads 7 and 8.

The lead 38 is connected to the control grids 41 and 42, associated, respectively, with the anodes 43 and 44, of the tube 3TU. The tube 3TU has the single cathode 45. The connection for the grids is through the capacitor 10C, the junction 46, and the grid resistor 47. The junction 46 is connected through resistor 11R to junction 37 on the potentiometer resistor PR.

During the time that the anode of tube 2TU is positive, a positive pulse at the grid of this tube will cause it to fire. When the tube 2TU fires, a pulse voltage will occur across the resistor 11R.

The phase shift circuit is so adjusted and the reversing switch 102 is so positioned that a pulse voltage from the scanner due to an edge or line located in the center of the scanned light area will occur when the anode voltage on tube 2TU is a maximum. The bias voltage for the grid of tube 2TU is of such polarity as to make the grid of the tube negative. As the lead 40 is shifted upwardly on the sensitivity potentiometer resistor P1, the control grid of the tube 2TU is made more and more negative. As the bias voltage is thus increased higher and higher, peak voltage pulses from the peaking transformer T3 are necessary to cause the tube 2TU to fire. By means of this control, it is thus apparent that the thyratron tube 2TU can be made insensitive to "hash," and extraneous pick-up from the scanned surfaces.

The direction in which the voltage across the secondary of the peaking transformer swings initially during a pulse depends upon whether the light increases or decreases at the photo-tube 10 as the image scans an edge or a line. The controlling pulse should drive the control grid of tube 2TU positive. The polarity reversing switch 101, usually in practice designated the Dark-Light reversing switch, provides for this polarity consideration.

Since the scanner and thus the impulse transformer produces two pulses during each cycle of supply voltage, it is apparent that the thyratron tube 2TU is sensitive only to the one that occurs while the anode is positive, and the polarity is correct with reference to the supply. The reversing switch 102, usually in practice designated a Left-Right switch, provides for this anode polarity consideration.

The capacitor 10C and resistor 11R, connected as shown, and having circuit constants properly selected, comprise an RC circuit. The output of tube 2TU is differentiated by this RC circuit. The pulse voltage appearing across 11R is in effect the duplicate of the input voltage to the tube 2TU, with the exception that all input pulses appearing immediately after the signal pulse are not transmitted by virtue of the characteristics of the thyratron tube 2TU. This is also a very desirable and necessary feature when scanning printed paper in order to distinguish between the edge and the printing.

By virtue of the connections shown, the voltage across 11R is simultaneously applied to the grids 41 and 42 of the twin triode tube 3TU. The tube 3TU does in effect constitute two separate tubes since the anode 43 and cathode 45 have one function and the anode 44 and cathode 45 have another similar function. The circuit for tube 3TU detects the direction and magnitude of the displacement of an edge or line from its controlled or desired path of travel. The alternating current for the anodes of this twin tube 3TU is supplied from the secondary windings of the transformer T5. The primary winding of the transformer T5 is supplied with alternating current from the leads 7 and 8 through suitable circuits connection means including leads L1 and 1L2 and 2L2 and the phase shift elements comprising the capacitor 20 and resistor 21, and transformer connections, to leads 7 and 8. The plate voltages, as seen from the connections shown for the plates, or anodes, 43 and 44, are 180° out of phase.

Figure 12:
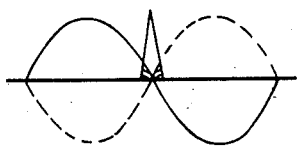

Since the signal pulse in the output circuit of tube 2TU may be made to occur at any point during an alternating current cycle of the supply, it is apparent that by a proper disposition of switches 101, 102 and 103 and a proper selection of the characteristics of associated elements, as the phase shift circuits including the capacitor 18 and resistor 19 and capacitor 20 and resistor 21, a time may be selected for the output signal pulse of the tube 2TU that occurs exactly when the voltages on the anodes 43 and 44 are going through zero, as indicated in Fig. 12. This kind of selection will usually be made when the web travel is along the line selected as the correct path of travel.

Figure 13:
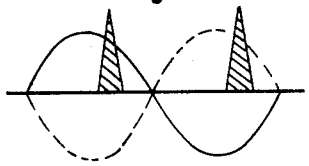

As seen from the shaded portions of Fig. 12 tube 3TU will thus conduct through anode 43 for a small portion at the end of the half cycle when anode 43 is positive and will conduct through anode 44 for a small portion at the beginning of the half cycle when anode 44 is positive. As both sections of tube 3TU conduct equally, equal relatively small voltages will occur across resistors 48 and 50, and as a result zero voltage difference will occur between the leads 49 and 51. If the selection of the position of the signal pulse is not made to occur when the voltages of the anodes 43 and 44 are going through zero and the web is traveling in the correct direction, as shown in Fig. 13, then the tube 3TU will conduct equally at each anode for successive half cycles. The current conducted by each anode 43 and 44 will be larger, but since the conduction is equal, zero voltage difference will occur between leads 49 and 51. It is thus apparent that if no pulse at all occurs, as when no web at all is on the machine, our apparatus is not set in action to drive the reel 1 to one extreme position. The web shifting apparatus is also not set in action when no voltage difference occurs across leads 49 and 51 because this means the web is traveling as desired.

If the voltage output pulse of tube 2TU occurs before or after both plates of tube 3TU are zero, one or the other anode of tube 3TU will conduct and a voltage difference will thus exist between leads 49 and 51. The polarity and magnitude of the voltage difference depends upon when the pulse occurs with reference to the polarities on the anodes 43 or 44. For one direction of shift of the web of the maximum shift likely to take place, the maximum voltage difference of one sense occurs at a peak plate, or anode, voltage. For a shift of the web in the opposite direction, for the maximum shift likely to occur, the maximum voltage difference will be opposite in sense. The reversing switch 103, usually in practice designated the Left-Right motor switch, provides for reversing the polarity of the voltage difference on the leads 49 and 51.

From the foregoing, it will be apparent that the polarity of leads 49 and 51 with respect to each other is an indication of the direction of the signal received from the photo-cell 10 and the magnitude of the voltage difference is a measure of the magnitude of the deviation of the web of material 2 from the desired direction of travel.

The output of tube 3TU, through the leads 49 and 51, is supplied to the amplifier tube 4TU. The output of tube 4TU is supplied to the amplifier tube 5TU. These two tubes and the circuits associated with them thus provide a direct current amplifier having a two-stage amplification.

Figure 9:
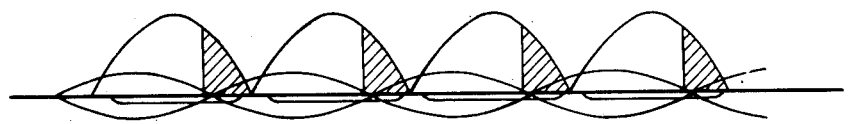
Figure 10:
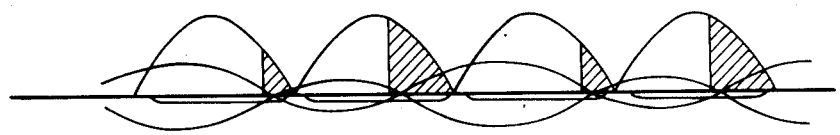

The output of the tube 5TU operates on the two thyratron tubes 6TU and 7TU. These tubes are phased back from 90 degree firing such that for zero voltage difference on leads 49 and 51, namely when there is either no material passing over the roll, or when the web 2 travels in the selected desired path of travel the thyratrons are fired as indicated in Fig. 9. When the web is displaced, say, rearwardly the thyratrons are caused to fire as indicated in Fig. 10. The effective armature current through the motor armature is thus a measure of the magnitude of the deviation of the web from the desired direction of travel. The connection of the motor armature is such that the motor operates in the proper direction to shift the reel 1 forwardly to reposition the web to the correct position.

Figure 11:
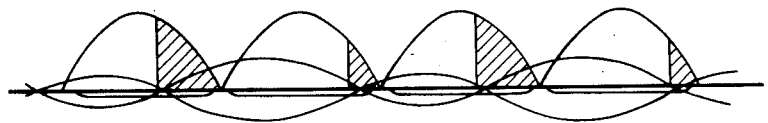

When the web is displaced forwardly, the effective armature current, as to magnitude and direction, is as shown in Fig. 11. The motor then operates to shift the reel rearwardly to reposition the web to the correct position.

Tubes 6TU and 7TU are, as shown, grid controlled. With zero voltage across leads 52 and 53, the conditions are such, with a selected negative bias on each of the tubes 6TU and 7TU, that the armature current is as shown in Fig. 9. When a voltage difference exists between the leads, then the armature currents will be either as shown in Fig. 10 or as shown in Fig. 11, depending on the sign, or polarity, and magnitude of the voltage difference between leads 52 and 53.

In short, when a voltage difference exists on leads 49 and 51 a positive and negative direct-current component adds to the respective grid voltages of tubes 6TU and 7TU causing one tube to conduct more and the other to conduct less. For large voltage differences on leads 49 and 51, one tube will cut off completely while the other tube conducts more and more as the voltage difference increases.

To understand the function of the tubes 6TU and 7TU more clearly, let us trace the control circuits. Let the assumption be that lead 54 is positive. Current will then flow from lead 54 through the selector switch, back contacts 66 on the "Left" push button, the limit switch 67, conductor 68, the anode of tube 6TU, the cathode of this tube, lead 57, transformer secondary 69, junction point 65, the motor M to lead 54.

When the lead 57 is positive, the current flows through the anode and cathode of tube 7TU, lead 76, limit switch 75, back contacts 74 of the "Right" push button, the selector switch, lead 54, the motor M, the transformer winding 69 to the lead 57. Since the thyratron tubes are reversely connected to the motor, the motor armature is for one positive half cycle on tube 6TU energized in one sense, and for the second positive half cycle on tube 7TU energized in an opposite sense. When the web is traveling along the desired path of travel, the energization is as shown in Fig. 9. It must be remembered that the tubes are reversely connected to the motor armature. The result is thus an alternating-current on the motor.

The purpose of the selenium rectifiers 56 and 71 is to maintain lead 61 at the cathode potential of the tube that is conducting such that the grid voltage applied to the conducting tube will be the sum of the alternating voltage obtained from the transformer 59 and the direct-current control voltage obtained from the tube 5TU.

When the lead 54 is positive, then the grid voltage for tube 6TU is the sum of the alternating-current voltage obtained from the secondary 58 and the direct voltage across resistor 60. The circuit for this voltage may be traced from lead 61, across the selenium rectifier 56, (in parallel to resistor 70) which is substantially a zero voltage drop, lead 57, capacitor 62, grid junction 63, resistor 64, lead 52, secondary 58, resistor 60 to the lead 61.

When lead 57 is positive, the grid circuit for tube 7TU may be traced from lead 61, through the selenium rectifier 71, which is substantially a zero voltage drop, the selector switch, switches 74 and 75, lead 76, capacitor 77, junction 78, resistor 79, lead 53, secondary 72, and resistor 73 to the lead 61.

When the direct-current voltage component across, say resistor 60, is more negative, and the direct-current voltage component across resistor 73 is more positive then the effective voltage supplied to motor M will be as shown in Fig. 10, whereas when the direct-current voltage component across, say resistor 73, is more negative and the direct-current voltage component across resistor 60 is more positive then the effective voltage supplied to the motor M will be as shown in Fig. 11.

From the foregoing detailed description of the control of tubes 6TU and 7TU, it is apparent that the direction of operation of the motor M will depend on the direction and magnitude of the error signal.

It should be noted that we provide a stabilizing network, consisting of the resistors 15R and 16R and the capacitors 13C and 14C for the tube 4TU. This network makes possible higher gains with equivalent stability.

The limit switches 67 and 75 are actuated by the traveling screw mechanism shown and are disposed to open the motor armature circuit to stop the motor when the correction called for exceeds a selected amount. The limit switches are usually also arranged to operate signalling lamps or other signal, or alarm devices.

When the operation is to be manual, then the selector switch is opened. The motor M can then be set in operation only by the operation of either the "Right" push button or the "Left" push button.

If the "Right" push button is depressed, the grid control for tube 6TU is shunted at contacts 80 and as a result zero voltage exists at the grid of tube 6TU. The tube 6TU thus fires and the motor operates the web to the right. No reverse operation can take place because operation of the "Right" push button opens the anode circuit of tube 7TU at contacts 74.

Movement of the web to the left is effected by operation of the "Left" push button.

While we have shown but one diagrammatic arrangement of our invention, our invention is not limited to the particular devices or structures illustrated, nor to the specific arrangements shown since the elements and their arrangement may be modified and altered without departing from the spirit and scope of our invention as set forth in the appended claims. Further, it is obvious that two separate tubes can be employed for the twin triode tubes mentioned above.

We claim as our invention:

1. In an electric control system for controlling the magnitude and sense of current flow in an electric circuit, the combination of, a photoelectric scanner fixed with reference to a machine through which a strand of material is moving longitudinally of itself, said material having an index mark disposed longitudinally thereof and which mark may be for example the edge of the material or a mark printed thereon, said scanner including a source of a beam of light, an oscillating reflector disposed to reflect the beam of light from the material at the index mark thereof at a selected frequency of oscillations, and a photoelectric cell disposed to be illuminated by the light reflected from the material at the mark and objects adjacent thereto, a bridge circuit including in two of the bridge legs a resistor and a grid controlled amplifier tube and including in the two other bridge legs a resistor and the photoelectric cell, a grid circuit for the amplifier tube interconnected with the photocell, whereby changes in bridge output effects are produced as a function of the change in reflected light falling on the photoelectric cell, and at a frequency equal to the frequency of the reflector, a pair of electronic tubes each having an anode, a cathode, and a control grid, circuits connection means for applying alternating current excitation to the anodes of said tubes in 180 degree phase relation, the alternating current having a frequency equal to the frequency of the oscillations of the reflector, means for simultaneously applying a potential, in synchronism with the bridge output effects and when the index mark is in its desired selected position, to each of the control grids at an instant when the voltages of the anodes of said electronic tubes are substantially zero, said last named means, being operable in synchronism with the bridge output effects, will thus shift the potential on the control grids in time phase in leading and lagging directions, respectively, depending on the direction of the departure of the index mark from the desired selected position, an electric circuit, and means responsive to the magnitude and sign of the differential effect of said pair of electronic tubes for controlling the magnitude and direction of current flow in said electric circuit.

2. The subject matter of claim 1 and means interconnected with the bridge circuit for changing the bridge output effects into sharp voltage peaks and control means, interconnected with the bridge circuit for changing the bridge output effects, for selecting bridge output effects caused during sweep of the light image over the index mark in one direction only to thus use signals of a given sign only, whereby the signal is made independent of whether a printed index line, or mark, is used or the edge of the material is considered the index mark.

3. The subject matter of claim 2 and a thyratron tube included in the control means to produce an amplified output pulse of one sign only during each complete cycle of the signals, and means for changing the sensitivity of the thyratron tube to thus be responsive to output effects of a magnitude greater than a selected magnitude.

4. The subject matter of claim 3 and means for modifying the output of the thyratron tube in character and phase position relative to the alternating current supplied to the anodes of said pair of electronic tubes.

References Cited in the file of this patent

UNITED STATES PATENTS

| | | |
|---|---|---|
| 2,220,737 | Jones | May 5, 1937 |
| 2,230,715 | Cockrell | Feb. 4, 1941 |
| 2,339,204 | Stockbarger et al. | Jan. 11, 1944 |
| 2,356,567 | Cockrell | Aug. 22, 1944 |
| 2,486,334 | Slamar | Oct. 25, 1949 |
| 2,458,926 | Bassett | Jan. 11, 1949 |